March 9, 1926.

S. R. SPATENGA 1,576,250

CLUTCH CONTROL FOR BRAKE MECHANISMS

Filed Dec. 1, 1921     3 Sheets-Sheet 1

Stephen R. Spatenga,
INVENTOR.
BY Elias M. Chapman,
ATTORNEY.

March 9, 1926.

S. R. SPATENGA 1,576,250

CLUTCH CONTROL FOR BRAKE MECHANISMS

Filed Dec. 1, 1921   3 Sheets-Sheet 2

Stephen R. Spatenga,
INVENTOR.
BY Chas. M. Chapman,
ATTORNEY.

March 9, 1926.
S. R. SPATENGA
1,576,250
CLUTCH CONTROL FOR BRAKE MECHANISMS
Filed Dec. 1, 1921  3 Sheets-Sheet 3
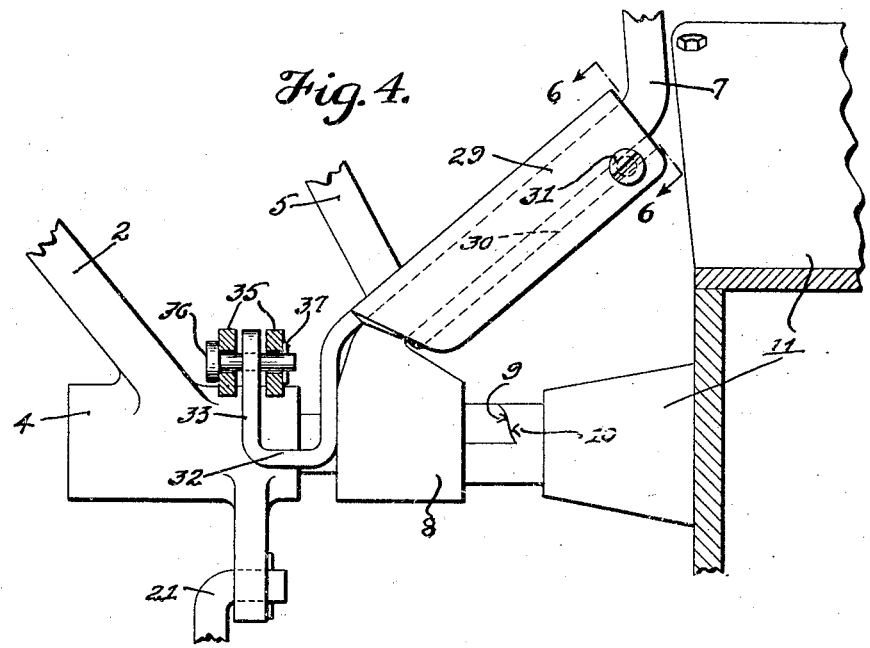
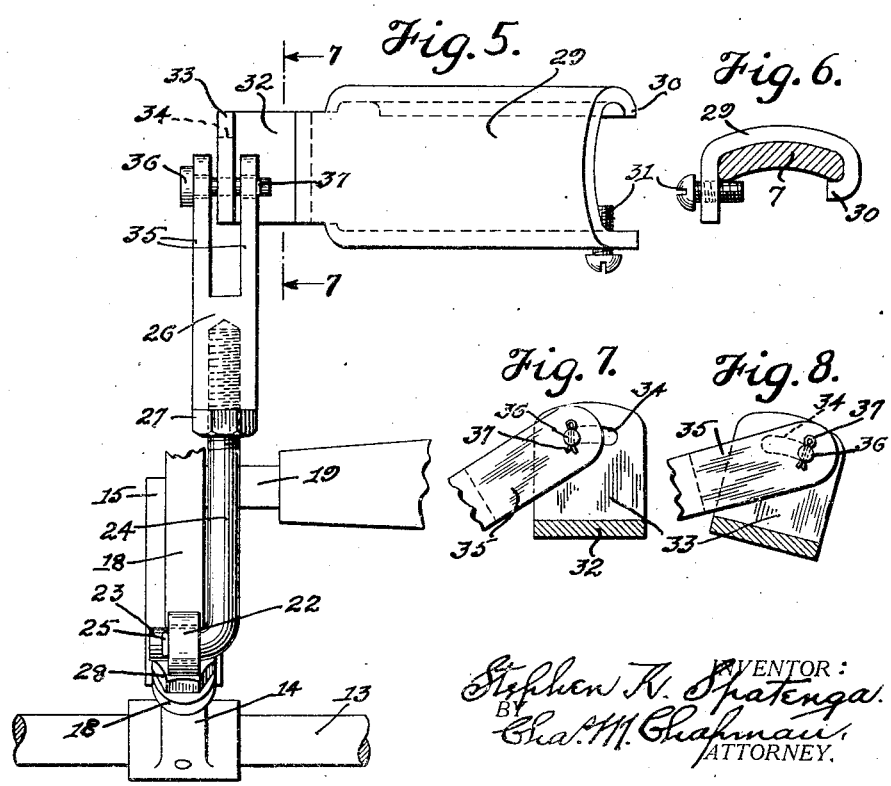

Patented Mar. 9, 1926.

1,576,250

UNITED STATES PATENT OFFICE.

STEPHEN R. SPATENGA, OF NEW YORK, N. Y.

CLUTCH CONTROL FOR BRAKE MECHANISMS.

Application filed December 1, 1921. Serial No. 519,054.

*To all whom it may concern:*

Be it known that I, STEPHEN R. SPATENGA, a citizen of Austria, residing in the borough of Manhattan, city, county, and State of New York, have invented a new and useful Improvement in Clutch Controls for Brake Mechanisms, of which the following is a description.

This invention has reference to the control of motor vehicles through the medium of a brake, and particularly relates to means by which the clutch, or similar mechanism, may be controlled by the service brake.

Motor vehicles such, for example, as those driven by hydrocarbon, or internal combustion, engines are provided with a clutch mechanism capable of being thrown into and out of operation upon shifting a pedal. In certain systems, when the clutch-pedal is in its extreme rearward position under control of a spring, the clutch is "in" and the second or high gear is in mesh and is driving the car. A forward movement of the clutch-pedal results in throwing the clutch "out" and shifting the gear to neutral. The car can now coast and the brakes can be applied at will. A continued and further forward movement of the clutch-pedal results in throwing the clutch "in" again and shifting the gear to first or low speed. In case of emergency, the emergency-brake lever may be, and is supposed to be, shifted so as to operate upon the clutch mechanism to throw it out of operation and at the same time shift the gear to neutral position. During this operation, the emergency-brake is applied under the operation of the emergency lever. This is a slow and unreliable operation; and, unless the adjustments are perfect, the brake is not sufficiently applied to overcome the momentum of the car and stop it within the required distance. Usually, in such system, the service brake is of sufficient strength and is much more quickly applied, since it is under control of the foot, through the medium of a pedal. In an emergency, as in a "jam" of traffic, it frequently becomes necessary to stop the car within its own length, regardless of its speed, and it is in such an emergency that the operator often "loses his head," or becomes confused, and forgets to use the emergency-brake lever, and, in endeavoring to throw the clutch out and the gear into neutral, presses upon the clutch-pedal too hard and passes the position for such operations, thus throwing in the first, or low and stronger gear, hence, accidents of a very serious nature frequently occur. It often happens, also, that a nervous or inexperienced driver, during ordinary operation of the car, will push the clutch-pedal forward beyond the neutral position and thus throw in the first or low gear, thus transmitting a more powerful drive through the transmission mechanism, and at the same time will throw on the service brake, hence causing the engine to drive against the brake, wearing out the brake-band and placing a greater load upon the engine. These various operations are of frequent occurrence and are due, in great measure, to the fact that, in the system of drive referred to, none but an expert and phlegmatic driver can "feel" the neutral position and bring about the results required in an emergency, as in congestion of traffic, or in suddenly coming upon some obstruction, or the imminence of conflict with a speeding car. With my invention the various difficulties are overcome, all objections are eliminated, control of the car is rendered positive and certain, and the driving of the car is made comparatively easy and devoid of all possibilities of accident.

Among the objects of my invention may be noted the following: to provide means by which the neutral position of the gear and the release of the clutch can be located and obtained while the service brake is being applied; to provide means by which the neutral position of the gear and the release of the clutch can be located and obtained just before the service brake is applied through the medium of the service pedal; to provide a means by which the clutch-pedal can be thrown positively and accurately to release position and the gear to neutral position preparatory to applying the service brake; to provide a means by which the clutch-pedal and brake-pedal can be shifted simultaneously, whereby to shift the gear to neutral position, release the clutch, and operate the service brake to functional position; to provide a means, in a system of automobile control, whereby the emergency brake mechanism is practically eliminated and main reliance is placed upon the service brake, through the medium of which the clutch may be released and the gear shifted to neutral position; to provide a means, in a system of automobile control, whereby the service brake pedal is utilized for the purpose of throwing out the clutch, shifting the gear, and applying the brake in a positive, accurate and certain manner, thereby simplifying the control of the car and eliminating all danger of collisions and accidents by throwing the clutch beyond release position and the gear into first driving position; to provide means by which, in an automobile, or similar power driven vehicle, the system of control is simplified to the extent of eliminating 50% of the operations heretofore required to throw out the clutch, shift the gear to neutral position, and apply the brake.

With the foregoing objects in view and others which will be detailed during the course of this description, my invention consists in the parts, features, elements and combinations thereof hereinafter described and claimed.

In order that my invention may be clearly understood, I have provided drawings wherein:

Figure 4 is a top plan view showing the shoe applied to the service-brake lever and illustrating the simple means of connection between the brake and clutch levers;

Figure 5 is a view showing details of my invention, which is in the form of an attachment to be applied to the service-brake lever;

Figure 6 is a cross-section substantially on the line 6—6 of Figure 4;

Figure 7 is a section substantially on the line 7—7 of Figure 5; and

Figure 8 is a view similar to Figure 7, showing another position of the parts.

Figure 1:
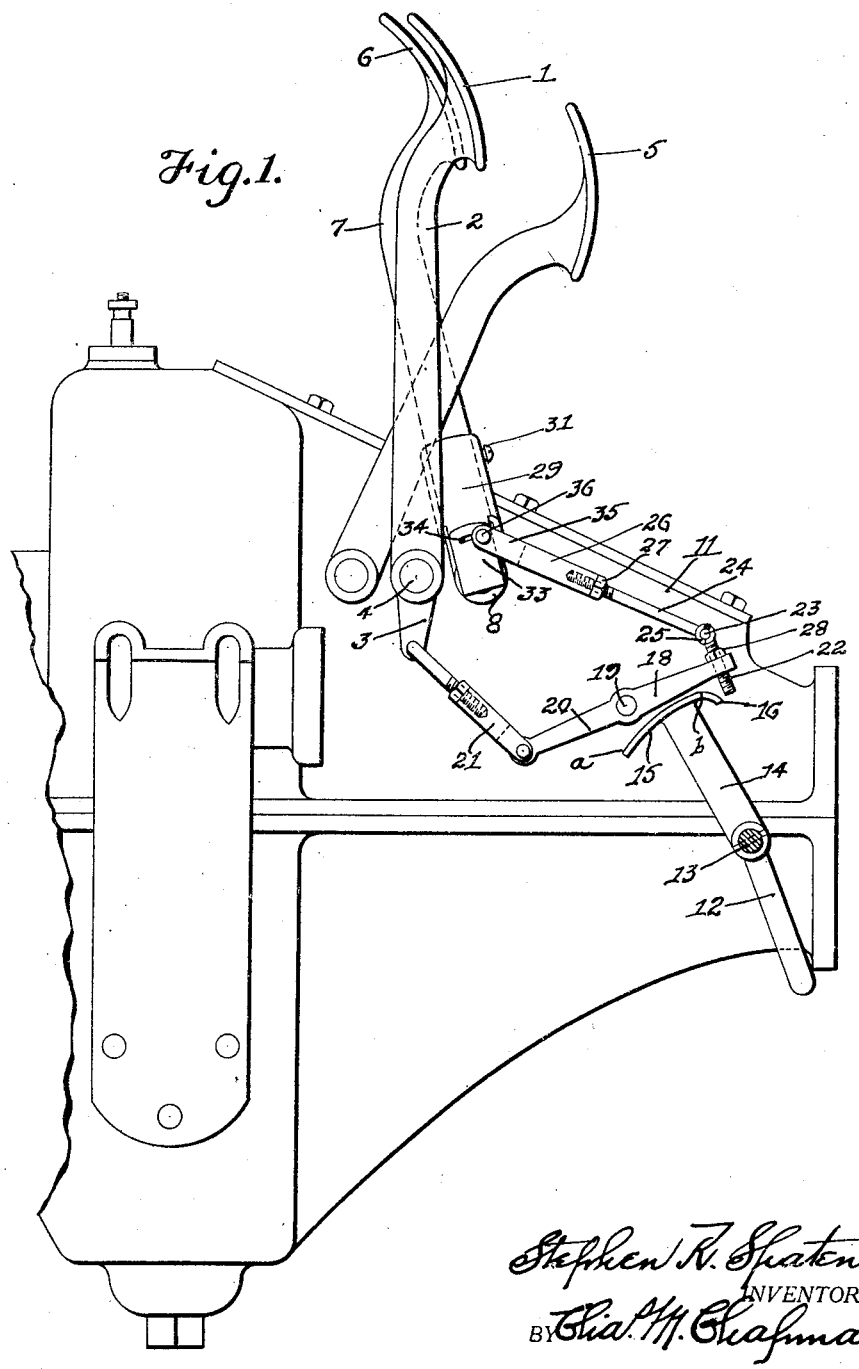
Figure 1 is a side elevation of so much of a well known car as is necessary to illustrate the usual control of such car with my invention embodied, and to show the clutch-pedal, service-brake pedal, reverse-pedal, and a part of the emergency brake mechanism, the parts being in second speed driving position.

Referring to the drawings, the numeral 1 indicates the clutch-pedal, 2 the long arm of the lever supporting the same, 3 the short arm and 4 the pivot. The reverse pedal is shown at 5; and the service-brake pedal at 6, supported on the long arm 7 of the lever, journaled at 8 for rocking and sliding movement, the hub of the lever having a cam surface 9 cooperating with a stationary cam surface 10 on the casing 11, as usual, in which the journal 8 is thus caused to rock and slide to apply the service brake. The emergency lever 12 is rigidly connected to a short rock-shaft 13, carrying an upwardly extending arm 14, provided with a segmental plate 15, part of which, between the points $a$ and $b$, is concentric with the axis of rotation of the arm, while the heel or remaining portion 16 is a sheer drop or cam adapted to operate upon the lower end of a bolt 17, Figure 2, carried by the clutch-operating mechanism, whereby the latter may be shifted by the emergency lever to a position representing the release of the clutch and neutral position of the gear. The bolt 17 passes through the end of an arm 18 of the clutch lever fulcrumed at 19, the arm 20 of which is loosely linked, by an adjustable connection 21, to the short depending arm 3 of the clutch pedal, the long arm 2 of which carries the pedal plate 1 for engagement by the left foot of the operator.

Figure 2:
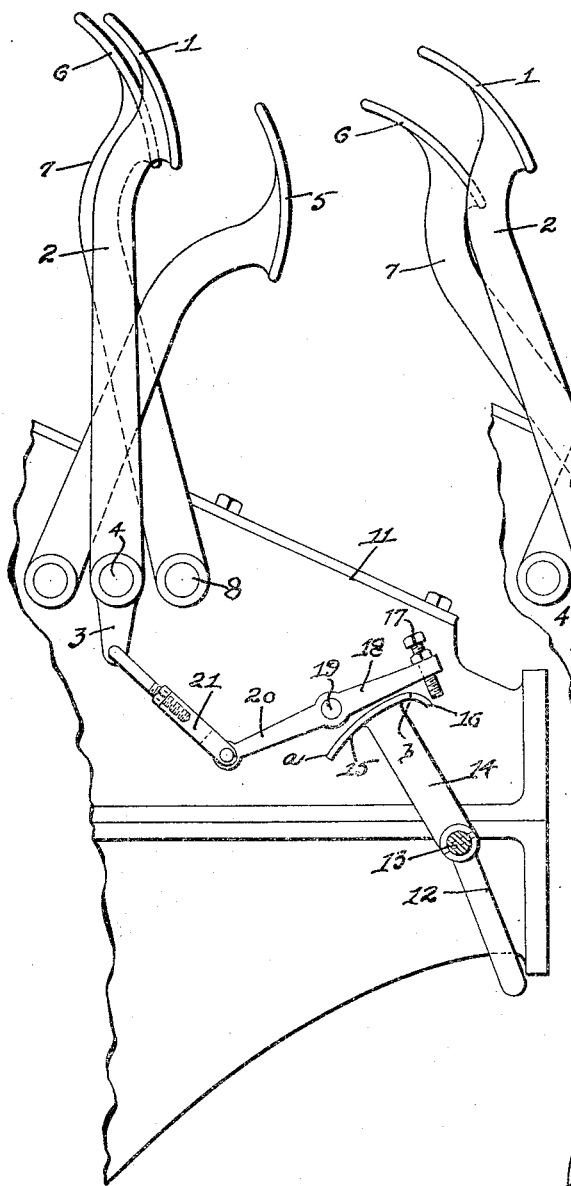
Figure 2 is a view similar to Figure 1 without my invention applied thereto.

Figure 2 shows the structure of the control mechanism of a well-known Ford car and is shown as an example of a control mechanism to which my invention is applied, and to show the simple way in which the same may be altered and modified to bring about the mode of operation and functional results which are an important part of my invention. All the parts so far referred to are usual.

Figure 3:
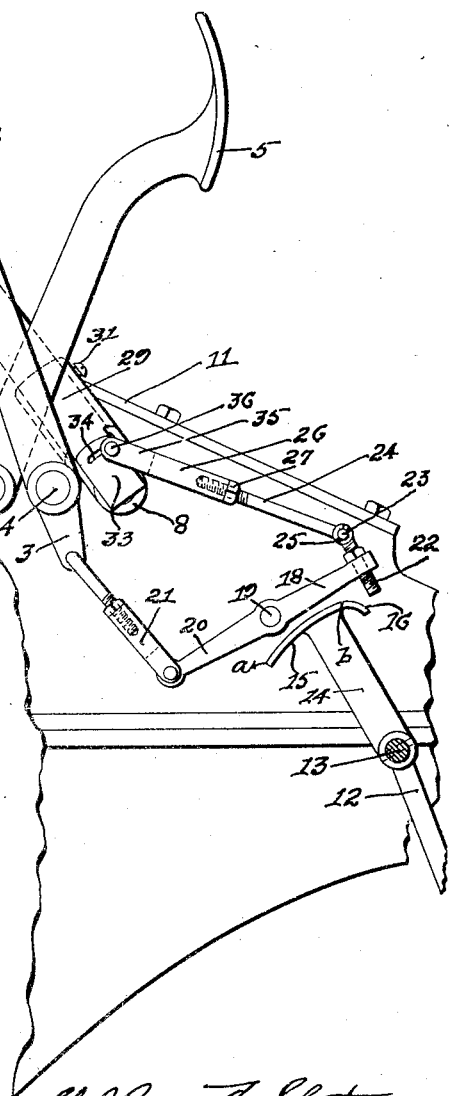
Figure 3 is a view similar to Figure 2 with my invention applied and showing a different position of the parts, as when, in an emergency, it becomes necessary to shift the gear to neutral, throw out the clutch, and apply the brake.

According to my invention, Figures 1 and 3, the bolt 17 is replaced by an eye-bolt 22, through the eye of which the bent end 23 of the adjustable bar 24 is passed and held by a cotter-pin 25. The screw-threaded end of bar 24 is adjustable in the forked member 26 and the adjustment is held by a nut 27, a similar nut 28 holding the adjustment of the eye-bolt 22 in the lever-arm 18. Referring to the details on sheet 3, it will be seen that the service pedal lever 7 has applied to it, just above its hub 8, a shoe 29 which grips the lever 7 on three sides and hooks over on the fourth side through the medium of a lip 30 extending along one longitudinal edge of the shoe. A screw or bolt 31 is passed through the opposite edge of the shoe and holds the latter firmly upon the arm of the lever, so that it cannot shift or have any movement during service. This structure provides a quick attachable and detachable means for application to any car provided with the system of control illustrated. The shoe, at its lower end, is given a U-shaped bend 32 and the upper free end 33 is provided with an elongated slot 34 extending laterally thereof, said upper end being embraced by the prongs 35 of the forked member 26 and a bolt 36 is passed through said prongs and slot and is held by a cotter-pin 37. This connection between the shoe and clutch lever is not only capable of yielding lengthwise of the adjustable link 24—26; but, can yield laterally because the parts 33, 35 and 36 are loosely fitted. Therefore, three important movements are permitted: the lateral movement of the brake pedal 7 relatively to the clutch pedal 2 under the influence of cams 9 and 10; the rocking movement of the clutch-pedal 2 relatively to the shoe 29; and the independent longitudinal movement of the operating connection between the clutch-operating mechanism and the service-brake lever. From these movements important functions result: (1) the clutch can be thrown out independently of the service brake by operating the emergency lever which shifts cam 16 under bolt 22 causing bolt 36 to slide in slot 34; (2) the service-brake lever can be caused to operate to release the clutch independently of the emergency lever; (3) the service-brake lever can shift laterally without affecting the operation of the clutch; (4) and the clutch-lever can be thrown clear forward beyond the position to which it is moved by the emergency-brake lever and without affecting the latter.

The mechanism portrayed in the drawings and described in the foregoing, it will be seen, is not only simple, economical, positive in operation and a direct connection between the clutch mechanism and the service brake mechanism; but, particularly, it is in the form of an attachment which may be applied to any motor vehicle having the system of drive and control herein referred to; the one particularly shown being merely for an example to illustrate the mode of application of my invention. As before stated, the particular system shown is that which is common to the Ford car, and, while I have shown this application of my invention, I desire it understood that the same is not to be taken as a limitation of my invention, but merely an illustration of a mode of applying and adapting the same for practical purposes. Various modifications can be made of the invention in order to adapt it to other systems of drive and control, without altering the principle of the invention or its general mode of operation, the main point being that, by the operation of one member to apply the service brake, the neutral position of the gear is at once attained and the clutch is at once thrown out, and this without any danger of overthrowing the clutch mechanism and bringing in the more powerful or low gear drive. This is broadly my invention, and it makes no difference to what system it is applied, nor through what means the control and operation may be attained.

From the foregoing description it will be seen, referring to Figures 1 and 2, that the parts are shown in their normal position, or a position which the parts will assume or normally have with the engine running, the clutch-lever under control of its spring and the clutch thrown in, the service-brake lever out of operation, the emergency-brake lever shifted forwardly so as not to influence the clutch mechanism, and the high speed gear in mesh with the transmission mechanism to drive the car. In the system as constructed without my invention applied thereto and as illustrated in Figure 2 of the drawings, if it is desired to operate the service brake, the left foot is first pressed upon the clutch pedal 1 pushing the clutch-lever 2 forwardly, and carefully "feeling" for position to throw out the clutch and shift the gear to neutral position. When the clutch is thrown out and the gear is shifted to neutral position, the service pedal 6 is pressed forwardly, thus shifting the lever 7 forwardly and laterally under influence of the cams 9 and 10, thus applying the service brake. This is apparently a simple operation and consists of two movements brought about one by each foot; but, if the operator is not skilful, or is nervous, or loses his head in an emergency, the clutch pedal is liable to be thrown past the throw-out position of the clutch and the neutral position of the gear, thus bringing the more powerful or low speed gear into mesh with the transmission mechanism, and causing the engine to drive the car against the grip of the service brake which has been applied by the movement of the right foot simultaneously with the shifting of the clutch pedal by the left foot. Or, in an emergency, a much slower operation may take place which frequently is so slow of action as to permit the accident to happen before the operation is carried out, viz; the operator reaches forward with his left hand, grips the emergency lever, shifts the same rearwardly, thus shifting the segment under the end of the bolt 17, Figure 2, thus shifting the clutch-lever and its pedal forwardly to throw-out position and neutral position of the gear. Simultaneously, the rear or emergency brake is applied and the car is brought to a stop. Not only is this operation slow, but is oftentimes forgotten, and reliance is had entirely upon the operation of the right foot upon the service pedal to apply the service brake, at the same time that the left foot is applied to the clutch pedal and the nervousness of the operator causes him to force the clutch pedal beyond clutch throw-out and neutral position of the gear, thus bringing in the first or more powerful drive of the transmission mechanism, as before noted.

These objections and difficulties are all overcome by my invention and any possibility of accident, which might result from such operations as described in the foregoing, is eliminated and prevented. Viewing Figures 1 and 3, wherein my invention is shown applied to the system of Figure 2, it will be seen that, with the car running at high speed and the parts all in the position of Figures 1 and 2, if an emergency arises, such as a "jam" of traffic, or imminence of collision, or striking an obstruction, the operator has merely to press upon the service-brake pedal 6 with the right foot, which will press forward the service-brake lever 7, thus also shifting it laterally under the influence of its cams 9 and 10, and simultaneously therewith the clutch mechanism will be operated by the link 24, 26 operating upon the lever 18, 20 and link connections 21, thus swinging the clutch-lever on its fulcrum and depressing the arm 2 to the position shown in Figure 3. This brings about the "throwout" of the clutch, the neutral position of the gear, and simultaneously the application of the service brake; and all these operations are brought about and accomplished by a single movement of the right foot pressing upon the service-brake pedal 6. From this it will be seen that, without shifting the emergency brake, or even thinking of its existence, when the operator gets into a jam or tight place, requiring instant action and control of the car, and assuming that he has been running along with the high speed transmission in operation, all that is required of the operator is to apply his right foot to the service pedal 6, press the same forwardly, and, during the movement of the pedal under foot pressure, the connection 24, 26 will positively, directly and accurately shift the clutch-lever 2 so as to throw out the clutch and bring the gear to neutral position. The application of the service brake takes place all during this movement and there is no possibility of the overthrow of the clutch-lever.

It will thus be seen that the car is under prefect control, that but one movement of one device is required, viz, pressure upon the service pedal to apply the brake, movement imparted to said pedal, shifting the clutch-lever to throw out the clutch and bring the gear to neutral position. By my mechanism the operation to control and bring the car to a dead stop is absolute, certain, positive and exceedingly rapid, and cuts down the operations for the purpose of at least 50%, and the Ford system of car control and drive is thereby brought up to the high standard of simplicity and rapidity of high priced cars.

Having thus described my invention, what I claim and desire to secure by Letters Patent is:

1. In combination with the clutch mechanism and its pedal and lever, and the service brake and its pedal, of an automoblie control system, a direct connection between said brake pedal and said lever including a U-shaped member and a forked member at the brake pedal, and a pin and slot connection between the two members enabling one of the members to shift laterally of the brake pedal and at an angle to the same, whereby the service brake pedal can shift laterally without affecting the clutch.

2. A controlling means for automobiles comprising a clutch mechanism including a pedal and a lever having an adjustable eye-bolt, a service brake mechanism including a pedal, a slotted member carried by the brake pedal, a link connection between the latter and the lever, one end of which is pivotally joined to the eye-bolt, whereby, when the brake pedal is shifted, the lever is shifted and may have movement independently of the brake pedal.

3. A clutch control mechanism for automobiles comprising a clutch lever, service brake pedal and emergency brake lever, a direct connection between the service brake pedal and clutch lever, whereby the latter is shifted to release the clutch when the former is operated to apply the brake, said connection including a slotted arm, a rod having a forked end embracing said arm and a pin connecting said forked end and arm and sliding in the slot of said arm forming a sliding joint between the service brake pedal and said connection, whereby when the emergency brake is operated, the clutch lever may be operated without operating the service brake lever.

4. An attachment for the clutch and service brake of an automobile control system consisting of a shoe having means whereby it may be applied to the service brake pedal, and having a U-shaped member in lateral extension of said means, a link pivotally connected to the clutch lever and having a pin and slot connection with a leg of said member, whereby said link may have movements in several angular directions relatively to said member.

STEPHEN R. SPATENGA.